United States Patent
Zhang et al.

(10) Patent No.: US 11,858,846 B2
(45) Date of Patent: Jan. 2, 2024

(54) GLASS WITH HIGH REFRACTIVE INDEX FOR FIBER OPTIC IMAGING ELEMENT WITH MEDIUM-EXPANSION AND FABRICATION METHOD THEREFOR

(71) Applicant: China Building Materials Academy, Beijing (CN)

(72) Inventors: Lei Zhang, Beijing (CN); Zhenbo Cao, Beijing (CN); Jinsheng Jia, Beijing (CN); Yun Wang, Beijing (CN); Yue Zhao, Beijing (CN); Xian Zhang, Beijing (CN); Xiaofeng Tang, Beijing (CN); Yu Shi, Beijing (CN); Jing Zhang, Beijing (CN); Zhiheng Fan, Beijing (CN); Huichao Xu, Beijing (CN); Haoyang Yu, Beijing (CN); Puguang Song, Beijing (CN); Aixin Wang, Beijing (CN); Changhua Hong, Beijing (CN)

(73) Assignee: China Building Materials Academy, Beijing (CN)

( * ) Notice: Subject to any disclaimer, the term of this patent is extended or adjusted under 35 U.S.C. 154(b) by 0 days.

(21) Appl. No.: 17/768,692

(22) PCT Filed: Jan. 29, 2022

(86) PCT No.: PCT/CN2022/075011
§ 371 (c)(1),
(2) Date: Apr. 13, 2022

(87) PCT Pub. No.: WO2023/040168
PCT Pub. Date: Mar. 23, 2023

(65) Prior Publication Data
US 2023/0242436 A1    Aug. 3, 2023

(30) Foreign Application Priority Data
Sep. 14, 2021  (CN) .......................... 202111074733.6

(51) Int. Cl.
| | |
|---|---|
| C03C 3/068 | (2006.01) |
| C03C 13/04 | (2006.01) |
| C03B 37/02 | (2006.01) |
| C03B 5/08 | (2006.01) |
| C03B 5/18 | (2006.01) |
| C03B 37/012 | (2006.01) |
| C03B 37/027 | (2006.01) |
| C03B 25/02 | (2006.01) |
| C03B 5/225 | (2006.01) |
| G02B 6/06 | (2006.01) |

(52) U.S. Cl.
CPC ............... *C03C 3/068* (2013.01); *C03B 5/08* (2013.01); *C03B 5/18* (2013.01); *C03B 5/225* (2013.01); *C03B 25/02* (2013.01); *C03B 37/01268* (2013.01); *C03B 37/027* (2013.01); *C03C 13/045* (2013.01); *C03C 2213/00* (2013.01); *G02B 6/06* (2013.01)

(58) Field of Classification Search
CPC ......... C03C 3/068; C03C 13/045; C03B 5/08; C03B 5/18; C03B 5/225; C03B 25/02; C03B 37/01268; C03B 37/02; G02B 6/06
See application file for complete search history.

(56) References Cited

U.S. PATENT DOCUMENTS 3,503,764 A    3/1970   Young

FOREIGN PATENT DOCUMENTS

| CN | 103482867 A | 1/2014 | |
|---|---|---|---|
| CN | 103755140 A | 4/2014 | |
| CN | 104402218 A | 3/2015 | |
| CN | 107337346 A | 11/2017 | |
| CN | 107935381 A | 4/2018 | |
| CN | 109179982 A | * 1/2019 | ............. C03C 3/068 |
| GB | 1302526 A | 1/1973 | |

OTHER PUBLICATIONS

International Search Report, PCT/CN2022/075011, dated May 31, 2022.
Written Opinion of the International Searching Authority, PCT/CN2022/075011, dated May 31, 2022.
First Office Action, 2021110747336, dated Oct. 10, 2022.

* cited by examiner

*Primary Examiner* — Elizabeth A. Bolden
(74) *Attorney, Agent, or Firm* — David R. Stevens; Stevens Law Group

(57) ABSTRACT

The present invention discloses a glass with high refractive index for fiber optic imaging elements with medium-expansion and fabrication method therefor, the glass comprising the following components in percentage by weight: $SiO_2$ 5-9%, $Al_2O_3$ 0-1%, $B_2O_3$ 23-28%, CaO 0-3%, BaO 6-12%, $La_2O_3$ 30-34%, $Nb_2O_5$ 4-8%, $Ta_2O_5$ 0-1%, $Y_2O_3$ 0-1%, ZnO 4-9%, $TiO_2$ 4-8%, $ZrO_2$ 4-6%, $SnO_2$ 0-1%. The present invention further provides a fabrication method for the glass with a high refractive index, comprising: putting raw materials quartz sand, aluminum hydroxide, boric acid or boric anhydride, calcium carbonate, barium carbonate or barium nitrate, lanthanum oxide, niobium oxide, tantalum oxide, yttrium oxide, zinc oxide, titanium dioxide, zirconium oxide and stannic oxide, etc. into a platinum crucible according to the requirement of dosing, melting at a high temperature, cooling and fining, leaking and casting to form a glass rod, and then annealing, cooling and chilling the molded glass rod.

8 Claims, 1 Drawing Sheet

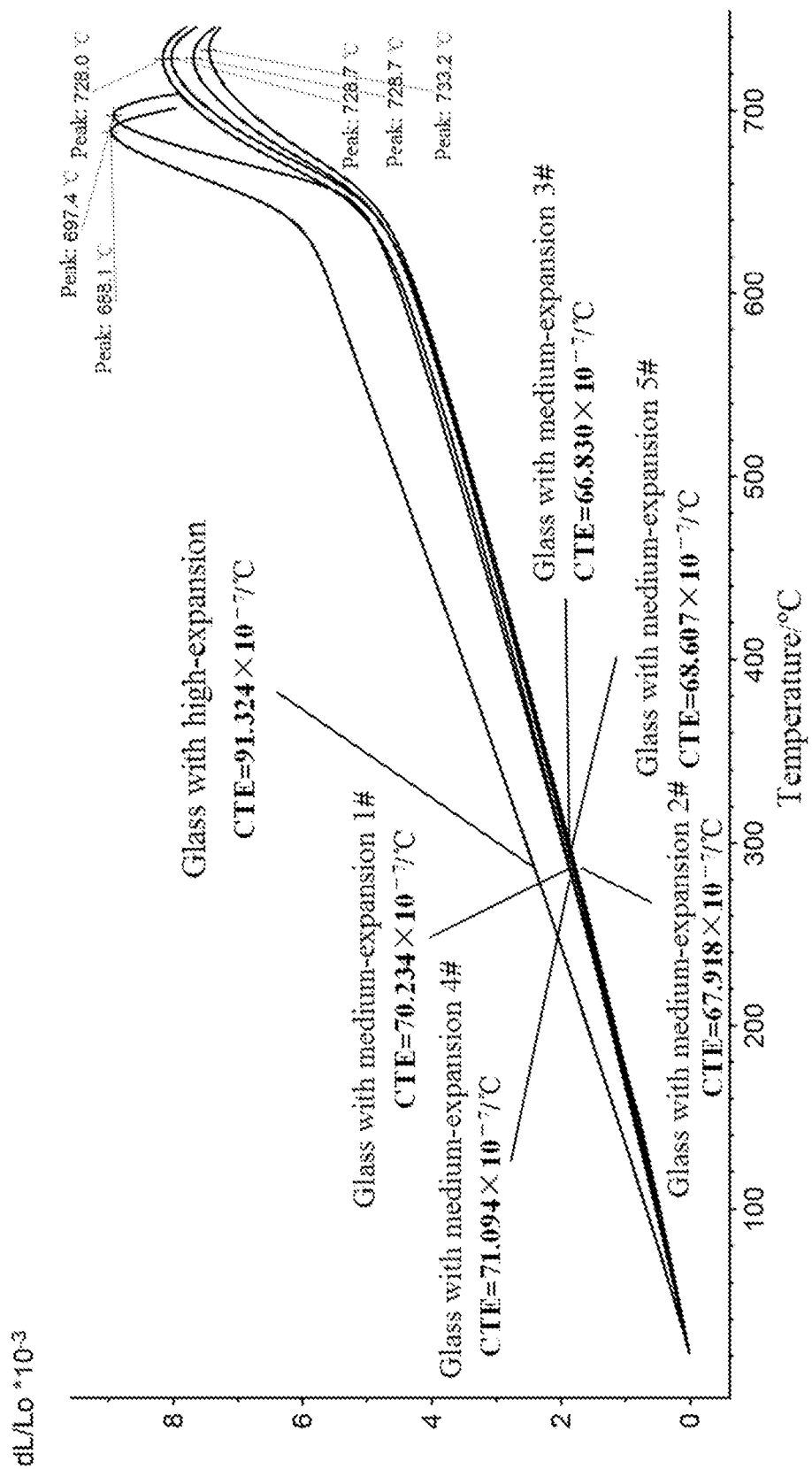

GLASS WITH HIGH REFRACTIVE INDEX FOR FIBER OPTIC IMAGING ELEMENT WITH MEDIUM-EXPANSION AND FABRICATION METHOD THEREFOR

TECHNICAL FIELD

The present invention relates to the field of technology of raw materials of fiber optic imaging elements and glass materials, in particular to a glass with high refractive index for fiber optic imaging elements with medium-expansion and fabrication method therefor.

BACKGROUND TECHNOLOGY

Fiber optic imaging elements include fiber optic faceplates, fiber optic image inverters, fiber optic tapers, fiber optic bundle for image transmission, etc. Fiber optic imaging elements are photoelectric imaging devices with excellent performance, which is fabricated by unique compositions of cladding glass, core glass and absorbing glass, and is fabricated by a drawing process of vacuum control and rod-tube combination, so that the product has good air tightness, small distortion, less spots, simple structure, small volume, light weight, large numerical aperture, high light transmission efficiency, small inter-stage coupling loss, high coupling efficiency, high resolution, clear and true image transmission, zero thickness image transfer and other characteristics, which can effectively improve the edge image quality. Fiber optic imaging elements are high-resolution imaging elements which formed by arranging tens of millions of optical fibers in parallel and heat press fusion process, and are key materials for image intensifiers and high-definition displays, which are widely used in various cathode ray displays, camera tube, CCD coupling, low-level-light night vision, medical equipment display, high-definition TV imaging and other instruments and equipments that need to transmit images in military, criminal investigation, aerospace, medicine and other fields, and which is a high-tech product in the industry of photoelectron in 21 century.

The most typical application of fiber optic imaging elements is as the optical input and output windows of low-level-light image intensifiers, which make an important role in improving the quality of imaging devices, and which in application need to be sealed with Kovar alloy, so effective sealing and matching with Kovar alloy having a similar coefficient of linear thermal expansion ($50\times10^{-7}/°$ C.) is required to improve the stability and prolong the service life of the low-level-light image tube. Fiber optic imaging elements currently used in China use a high expansion system with a coefficient of thermal expansion in the range of $(87\pm5)\times10^{-7}/°$ C., which is far from the sealing matching degree of Kovar alloy. In order to improve the thermal stability of the image intensifier device, it is necessary to adopt the fiber optic imaging elements with medium-expansion system, but there is no suitable material with medium-expansion system at present.

SUMMARY

In order to solve the technical problems in the prior, the present invention provides a glass with high refractive index for fiber optic imaging elements with medium-expansion and fabrication method therefor.

To achieve the above purposes, the technical solution of the present invention is as follows:

A composition of glass with high refractive index for fiber optic imaging elements with medium-expansion, comprises the following components in percentage by weight:
$SiO_2$ 5-9%
$Al_2O_3$ 0-1%
$B_2O_3$ 23-28%
$CaO$ 0-3%
$BaO$ 6-12%
$La_2O_3$ 30-34%
$Nb_2O_5$ 4-8%
$Ta_2O_5$ 0-1%
$Y_2O_3$ 0-1%
$ZnO$ 4-9%
$TiO_2$ 4-8%
$ZrO_2$ 4-6%
$SnO_2$ 0-1%

Preferably, the composition comprises the following components in percentage by weight:
$SiO_2$ 9%
$Al_2O_3$ 100
$B_2O_3$ 23%
$BaO$ 12%
$La_2O_3$ 34%
$Nb_2O_5$ 4%
$Ta_2O_5$ 0.5%
$ZnO$ 4%
$TiO_2$ 8%
$ZrO_2$ 4%
$SnO_2$ 0.5%

Further, the glass with high refractive index has a refractive index of 1.80-1.82, an coefficient of average linear thermal expansion of $(68\pm5)\times10^{-7}/°$ C. in the range of 30-300° C., a strain point temperature of more than 600° C., a devitrification temperature of more than 820° C., and a high spectral transmission. The glass does not contain any heavy metal oxides such as $As_2O_3$, $Sb_2O_3$, $PbO$, $CdO$, etc., and has the advantages of good chemical stability and so on.

Further, the present invention provides a fabrication method for the glass with high refractive index for fiber optic imaging elements with medium-expansion using the composition related above, comprising the following steps:

(1) putting quartz sand, aluminum hydroxide, boric acid or boric anhydride, calcium carbonate, barium carbonate or barium nitrate, lanthanum oxide, niobium oxide, tantalum oxide, yttrium oxide, zinc oxide, titanium dioxide, zirconium oxide and stannic oxide into a platinum crucible according to the requirement of dosing;

(2) melting at a first preset temperature, stirring in the melting process, then cooling to a second preset temperature and fining to obtain a fining glass melt;

(3) allowing the fining glass melt to flow down through a leaking port, and casting the fining glass melt in a mold to form a glass rod;

(4) annealing the molded glass rod in an annealing furnace, and then cooling to the room temperature along with the furnace.

The first preset temperature is 1350-1450° C.; the melting time is 4-8 hours; the stirring in the melting process is 1-2 times; the second preset temperature is 1300-1340° C.; the fining time is 1-2 hours.

The annealing process is preserving heat for 1 hour at 600-650° C., and cooling to 60° C. from 600-650° C. for 12 hours.

The present invention further provides a glass with high refractive index for fiber optic imaging elements with medium-expansion, which is fabricated according to the above method.

The present invention further provides an optical glass, which is fabricated by using the glass with high refractive index. The optical glass has a viscosity curve of strong liquid fragility in the viscosity range of $10^2$-$10^{13}$ dPas and is easier to handle and reduce bubbles and stripes.

The present invention further provides an fiber optic imaging element including fiber optic faceplates, fiber optic image inverters, fiber optic tapers, fiber optic bundle for image transmission, wherein the fiber optic imaging elements is fabricated by a drawing process of combing a core glass rod and a cladding glass tube, and the core glass rod is fabricated by using the above glass with high refractive index.

The present invention further provides a glass with high refractive index for fiber optic imaging elements with medium-expansion in optical technology and photoelectronic technology, wherein the optical technology and photoelectronic technology includes technologies of imaging, projection, photoelectronic communication, mobile terminal and laser.

Compared to the prior art, the glass with high refractive index for fiber optic imaging elements with medium-expansion in the present invention has the following characteristics:

(1) the core glass with medium-expansion has a coefficient of thermal expansion similar to Kovar alloy, the coefficient of mean linear thermal expansion in the range of 30 to 300° C. is $(68\pm5)\times10^{-7}$/° C., and the strain point temperature is more than 600° C., which can be used with a sealing material of medium-expansion low-level-light image intensifiers to achieve perfect sealing;

(2) the core glass with medium-expansion has a high refractive index of $n_D$ of 1.80~1.82, which can achieve the best light transmission ability of the fiber optic and satisfy the optimum condition of total reflection of the fiber optic that number aperture N.A.≥1;

(3) the core glass with medium-expansion has a good anti-crystallization performance of devitrification temperature >820° C., and has a good transparency to visible light radiation and a good chemical stability, which can meet the requirement of special process of fabricating the fiber optic image inverter, and can achieve that the glass remain characteristics of the glass itself unchanged after going through many times of high temperature fiber drawing, high temperature fusing, high temperature twisting or taper drawing.

(4) the fiber optic imaging element with medium-expansion does not contain any heavy metal oxides which seriously harmful to the environment such as $As_2O_3$, $Sb_2O_3$, PbO, CdO, etc.

The glass with a high refractive index for a fiber optic imaging element with medium-expansion provided by the present invention is suitable for use as the core glass of optical fibers in the fabrication for the fiber optic imaging element with medium-expansion.

The glass with high refractive index of the present invention has a sealing matching degree with Kovar alloy and a good thermal stability, and adopts the fiber optic imaging element with medium-expansion with the coefficient of expansion of $(68\pm5)\times10^{-7}$/C to have a better thermal stability, adapt to temperature changes in a wider range of environments such as deserts, plateaus, snow-covered areas, oceans, jungles, etc., and further to increase application performance and service life of the low-level-light image tube.

In the present invention, $SiO_2$ is a glass-forming oxide, which plays an important role in the glass net, and improves chemical resistance. The weight percentage (wt. %) of $SiO_2$ is 5-9. When the content of $SiO_2$ is lower than 5 wt. %, it is difficult to obtain a glass with medium-expansion coefficient, and the chemical resistance stability of the glass is reduced at the same time; when the content of $SiO_2$ is higher than 10 wt. %, the high temperature viscosity of the glass will increase. As a result, the melting temperature of the glass is too high and the probability of the glass phase separation increases at the same time.

$Al_2O_3$ is an intermediate oxide of the glass, and $Al^{3+}$ has two coordination states, that is, in tetrahedron or octahedron. When the content of oxygen is enough in the glass, an aluminum-oxygen tetrahedron [$AlO_4$] is formed and forms a continuous network with a silicon-oxygen tetrahedron. When the content of oxygen is insufficient in the glass, an aluminum-oxygen octahedron [$AlO_6$] is formed, which is the network modifier and is in the hole of the silicon-oxygen structure network, so $Al_2O_3$ and $SiO_2$ could form the main body of the glass network in a certain content range. The weight percentage (wt. %) of $Al_2O_3$ is 0-1, and when the content of $Al_2O_3$ is higher than 1 wt. %, the high temperature viscosity of the glass will increase. As a result, the glass melting temperature is too high and the devitrification performance declines at the same time.

$B_2O_3$ is a glass-forming oxide, and also the main component of the glass net, and also a fluxing agent to reducing glass melting viscosity. Boron-oxygen triangle [$BO_3$] and boron-oxygen tetrahedron [$BO_4$] are the structural components, and boron may exist as triangle [$BO_3$] or boron-oxygen tetrahedron [$BO_4$] under different conditions. In high temperature melting conditions, it is difficult to form boron-oxygen tetrahedron, and can only exist in the form of trihedral, but at low temperature, $B^{3+}$ has the tendency to capture free oxygen to form tetrahedron under certain conditions, which makes the structure compact to improves the low temperature viscosity of glass, as it has the characteristics of reducing the glass viscosity at high temperature and increasing the glass viscosity at low temperature, and it is also the main component to reduce the refractive index of glass, which determines that its content range is small. The weight percentage (wt. %) of $B_2O_3$ is 23-28. when the content of $B_2O_3$ is lower than 23 wt. %, which cannot play the role to help melting and meanwhile reduces the chemical stability of the glass; when the content of $B_2O_3$ is more than 28 wt. %, which will reduce the refractive index of the glass and meanwhile increase the tendency of the glass phase separation.

In the present invention, the network former oxides with high content of $B_2O_3$ and $SiO_2$ will decline the refractive index of the glass, thus it is impossible to achieve medium-expansion, or the glass system has a more tendency to devitrification under the condition of certain combinations of rare earth metal oxides and conventional network former oxides. For these reasons, the content of $B_2O_3$ must be more than the content of $SiO_2$.

CaO is a network modifier oxide of glass structure, and the weight percentage (wt. %) of CaO is 0-3. When the content of CaO is more than 3 wt. %, the chemical resistance stability of the glass is reduced, and the coefficient of thermal expansion of the glass is increased.

BaO is a network modifier oxide of glass structure, which can effectively improve the refractive index of glass. The weight percentage (wt. %) of BaO is 6-12. When the content of BaO is less than 6 wt. %, the refractive index of glass is reduced; when the content of BaO is more than 12 wt. %, the devitrification temperature of the glass is increased, the devitrification tendency of the glass is increased, and the density of the glass is increased significantly at the same time.

$La_2O_3$ is a lanthanide series rare earth oxide, which can improve the refractive index of glass. The weight percentage (wt. %) of $La_2O_3$ is 30-34, when the content of $La_2O_3$ is more than 34 wt. %, the coefficient of thermal expansion of the glass will increase; when the content of $La_2O_3$ is less than 30 wt. %, it will decrease the refractive index of the glass.

$Nb_2O_5$ is also a rare earth oxide, which can improve the refractive index and the process performance of glass, and lengthen the liquid fragility of glass. The weight percentage (wt. %) of $Nb_2O_5$ is 4-8, when the content of $Nb_2O_5$ is more than 8 wt. %, the density and coefficient of thermal expansion of the glass is increased; when the content of $Nb_2O_5$ is less than 4 wt. %, the refractive index of the glass is decreased. "high or low liquid fragility" refers to the steep of slope of the viscosity-temperature curve of the glass in the viscosity range of $10^2$-$10^{13}$ dPas, that is, the fluctuate level of the viscosity of the glass with temperature change in this viscosity range. The glass in the present invention has the advantage of being slightly stronger liquid fragility of glass than the comparable glass of the prior art in both critical temperature ranges, and the glass in the present invention is easier to handle and reduce stripes.

$Ta_2O_5$ is also a rare earth oxide, which can increase the refractive index of glass. The weight percentage (wt. %) of $Ta_2O_5$ is 0-1, when the content of $Ta_2O_5$ is more than 1 wt. %, the density and coefficient of thermal expansion of the glass is increased, and the manufacturing cost will increased at the same time.

$Y_2O_3$ is also a rare earth oxide, which can improve the refractive index and the process performance of glass and reduce the melting temperature and devitrification temperature of glass. The weight percentage (wt. %) of $Y_2O_3$ is 0-1. When the content of $Y_2O_3$ is more than 1 wt. %, the cost of glass is increased.

ZnO is used to reduce the melting temperature of glass, and improve the chemical resistance and refractive index of glass, the weight percentage (wt. %) of ZnO is 4-9%. When the content of ZnO is more than 9 wt. %, the chemical resistance stability of glass is reduced and the coefficient of thermal expansion of glass is increased; when the content of ZnO is less than 4 wt. %, the refractive index of glass will reduced.

$TiO_2$ is used to improve the refractive index and the transmittance of glass and increase the oxide of the glass network, thereby reducing the density and high temperature viscosity of glass, which is beneficial to the fining of the glass melt and the elimination of stripes in the process of glass melting. The weight percentage (wt. %) of $TiO_2$ is 4-8. When the content of $TiO_2$ is more than 8 wt. %, the coefficient of thermal expansion of glass is increased; when the content of $TiO_2$ is less than 4 wt. %, the refractive index of glass is reduced. In the high refractive index glass of the present invention, $TiO_2$ can react with iron impurity to form brown iron-titanate complex; in addition, the combination of $TiO_2$ and rare earth metal oxides, $Ta_2O_5$, $Nb_2O_5$ is very challenging in terms of process, because $Nb_2O_5$ also releases oxygen at high temperatures and competes free oxygen with $TiO_2$ which is still dissolved in the glass; if the process is not precisely controlled, the result may be a brown glass.

$ZrO_2$ is used to improve the refractive index and the transmittance of glass, and has the effect of adjusting optical performances and improving the chemical resistance. The weight percentage (wt. %) of $ZrO_2$ is 4-6. When the content of $ZrO_2$ is more than 6 wt. %, the glass melting temperature and the devitrification tendency will increased.

$SnO_2$ is used to fining the glass melting, which can improve the chemical resistance and the transmittance of glass. The weight percentage (wt. %) of $SnO_2$ is 0~1%. When the content of $SnO_2$ is more than 1 wt. %, the bubbles inside the glass will increased.

In the present invention, the following expressions "without X" or "not contain component X" mean that component X hardly exists in the glass, that is, if any, the component exists only as an impurity, which is not added to the composition as a desired component. The glass of the present invention belongs to boron lanthanum barium silicate glass, and the glass does not contain heavy metal oxides such as $As_2O_3$, $Sb_2O_3$, PbO, CdO, etc., which are seriously harmful to the environment, even if there is an extremely microelement amount, it is due to the introduction of other raw materials of the glass.

BRIEF DESCRIPTION OF THE DRAWINGS

FIG. 1 is a comparison diagram of tests of the coefficient of thermal expansion of embodiments in the present invention and a glass with high coefficient of thermal expansion.

DETAILED DESCRIPTION

In order to make the purposes, technical solutions and advantages of the present invention to be more clarity, the present invention will be further described in detail with reference to detailed embodiments, but not limited by the description.

The measured parameters, measuring methods and instruments of the glass with high refractive index used for the fiber optic imaging element with medium-expansion of the present invention are as follows:

(1) refractive index $n_D$ [the refractive index of glass at λ=589.3 nm];

(2) the average coefficient of thermal expansion $\alpha_{30/300}$ [$10^{-7}$/° C.] at 30-300° C.

Wherein the refractive index $n_D$ of glass is measured by a refractive index device; the coefficient of linear thermal expansion at 30-300° C. is measured by a horizontal dilatometer using the method specified in ISO 7991, and expressed by a coefficient of mean linear thermal expansion. Chemical compositions (wt. %) and glass performances of the embodiments are detailed listed in Table 1.

TABLE 1 chemical compositions (wt. %) and physical values of the glass samples

| composition | embodiment 1 | embodiment 2 | embodiment 3 | embodiment 4 | embodiment 5 |
|---|---|---|---|---|---|
| $SiO_2$ | 9 | 7 | 7 | 8 | 5 |
| $Al_2O_3$ | 1 | 0 | 0 | 0 | 5 |
| $B_2O_3$ | 23 | 25 | 25 | 24 | 28 |
| CaO | 0 | 0 | 0 | 0 | 3 |
| BaO | 12 | 8.4 | 10 | 7 | 6 |
| $La_2O_3$ | 34 | 32.8 | 32 | 34 | 30 |
| $Nb_2O_5$ | 4 | 7 | 6 | 7.5 | 8 |
| $Ta_2O_5$ | 0.5 | 0.5 | 0.5 | 0 | 0.5 |
| $Y_2O_3$ | 0 | 0 | 0 | 0.5 | 0 |
| ZnO | 4 | 8 | 8 | 7 | 9 |
| $TiO_2$ | 8 | 7 | 6 | 5 | 4 |
| $ZrO_2$ | 4 | 4 | 5 | 6 | 6 |
| $SnO_2$ | 0.5 | 0.26 | 0.5 | 1 | 0.5 |
| $\alpha_{30/300}$ [$10^{-7}$/° C.] | 70.234 | 67.918 | 66.830 | 71.094 | 68.607 |
| $n_D$ | 1.80 | 1.82 | 1.82 | 1.82 | 1.81 |

The raw materials used in the following embodiments and their requirements are as follows:

Quartz sand (high purity, 150 μm oversize is less than 1%, 45 μm undersize is less than 30%, the content of $Fe_2O_3$ is less than 0.01 wt. %), aluminum hydroxide (analytical purity, average particle size 50 μm), boric acid or boron anhydride (400 μm oversize is less than 10%, 63 μm undersize is less than 10%), calcium carbonate (analytical purity, average particle size 250 μm), barium carbonate (analytical purity, purity ≥99.0%), lanthanum trioxide (5N), niobium pentoxide (5N), tantalum pentoxide (5N), yttrium trioxide (5N), zinc oxide (analytical purity), titanium dioxide (chemical purity), zirconium oxide (analytical purity), stannic oxide (analytical purity).

Referring to FIG. 1, CTE in figures is Coefficient of Thermal Expansion, which test range is 30-300° C. The coefficient of thermal expansion of the comparative high expansion glass is 91.324×10$^{-7}$/° C., and the coefficient of thermal expansion of embodiment 1 to embodiment 5 in the present invention respectively is 70.234×10$^{-7}$/° C., 67.918×10$^{-7}$/° C., 66.830×10$^{-7}$/° C., 71.094×10$^{-7}$/° C., 68.607×10$^{-7}$/° C.

The present invention will be further described below through the specific preparation method of embodiments:

Embodiment 1

Firstly, raw materials are selected according to the glass composition of embodiment 1 in Table 1, and oxides of elements with valence state change in the glass raw materials such as $Fe_2O_3$ are strictly controlled, and the content of $Fe_2O_3$ in a finished product of glass is less than 100 PPm. The glass batch meets the chemical compositions of glass in Table 1, and then quartz sand, aluminum hydroxide, boric acid, calcium carbonate, barium carbonate, lanthanum oxide, niobium oxide, tantalum oxide, yttrium oxide, zinc oxide, titanium dioxide, zirconium oxide and stannic oxide are put into a platinum crucible and melted for 6 hours at 1400° C. In the glass melting process, the glass is stirred twice to melt evenly. After melting, the glass is cooled to 1320° C. and fining for 2 hours to obtain a molten glass. Thereafter, the molten glass is cast into a test specimen according to the specified requirements, then annealing is carried out and the annealing process is that preserving heat for 1 hour at 625° C., and cooling to 60° C. from 625° C. for 12 hours, and then cooling to room temperature along with the furnace. Its test performance is shown in Table 1, (1) a refractive index is 1.80; (2) a coefficient of mean linear thermal expansion at 30-300° C. is 70.234×10$^{-7}$/° C.

Embodiment 2

The actual composition of glass refers to embodiment 2 in Table 1, and uses the same requirements for raw material as embodiment 1. Quartz sand, aluminum hydroxide, boric anhydride, calcium carbonate, barium nitrate, lanthanum oxide, niobium oxide, tantalum oxide, yttrium oxide, zinc oxide, titanium dioxide, zirconium oxide and stannic oxide are put into a platinum crucible and melted for 8 hours at 1350° C. In the glass melting process, the glass is stirred once to melt evenly. After melting, the glass is cooled to 1300° C. and fining for 1 hour to obtain a molten glass. Thereafter, the molten glass is cast into a test sample according to the specified requirements, then annealing is carried out and the annealing process is that preserving heat for 1 hour at 650° C., and cooling to 60° C. from 650° C. for 12 hours, and then cooling to room temperature along with the furnace. The test conditions used are the same as embodiment 1, and the basic performances of samples are shown in Table 1. (1) a refractive index is 1.82; (2) an coefficient of mean linear thermal expansion at 30-300° C. is 67.918×10$^{-7}$/° C.

Embodiment 3

The actual composition of glass refers to embodiment 3 in Table 1, and uses the same raw material and requirements for raw material as embodiment 1. Raw materials are melted for 4 hours at 1450° C. In the glass melting process, the glass is stirred twice to melt evenly. After melting, the glass is cooled to 1340° C. and fining 2 hours to obtain a molten glass. Thereafter, the molten glass is cast into a test sample according to the specified requirements, then annealing is carried out and the annealing process is that preserving heat for 1 hour at 600° C., and cooling to 60° C. from 600° C. for 12 hours, and then cooling to room temperature along with the furnace. The test conditions used are the same as embodiment 1, and the basic performances of samples are shown in Table 1. (1) a refractive index is 1.82; (2) an coefficient of mean linear thermal expansion at 30-300° C. is 66.830×10$^{-7}$/° C.

Embodiment 4

The actual composition of glass refers to embodiment 4 in Table 1, uses the same raw material and requirements for raw material as embodiment 1 and adopts the same melting process system and test conditions as embodiment 1. The basic performances of samples are shown in Table 1. (1) a refractive index is 1.82; (2) a coefficient of mean linear thermal expansion at 30-300° C. is $71.094 \times 10^{-7}/°$ C.

Embodiment 5

The actual composition of glass refers to embodiment 5 in Table 1, uses the same raw material and requirements for raw material as embodiment 1 and adopts the same melting process system and test conditions as embodiment 1. The basic performances of samples are shown in Table 1. (1) a refractive index is 1.81; (2) a coefficient of mean linear thermal expansion at 30-300° C. is $68.607 \times 10^{-7}/°$ C.

From the data obtained in embodiments, it can be known that the glass with high refractive index for fiber optic imaging elements with medium-expansion of the present invention has the advantages of high refractive index and does not contain heavy metal oxides that are seriously harmful to the environment, and is suitable for fabricating fiber optic imaging elements. The fiber optic imaging element can be a fiber optical faceplate, a fiber optical image inverter, a fiber optical taper and a fiber optical bundle for image transmission, etc., wherein the core glass used is fabricated from the glass with high refractive index for fiber optic imaging elements with medium-expansion of the present invention.

In addition, with the development trend of miniaturization of optical technology and photoelectronic technology, a glass with a high refractive index has an excellent chemical stability, a low coefficient of thermal expansion, and an excellent transmission can shorten the focal length of lens to achieve that shorten the size of the component or lens assembly. The glass with a high refractive index of the present invention can be used as an optical glass for this type of technology.

The above descriptions are only exemplary embodiments of the present invention, and are not intended to limit the present invention. The protection scope of the present invention is claimed by the claims, and any modification, equivalent replacement, improvement, etc. made to the present invention by those skilled in the art within the spirit and protection scope of the present invention should be included in the protection scope of the present invention.

What is claimed is:

1. A composition of glass with high refractive index for fiber optic imaging elements with medium-expansion, comprising the following components in percentage by weight:
   $SiO_2$ 5-9%
   $Al_2O_3$ 0-1%
   $B_2O_3$ 23-28%
   CaO 0-3%
   BaO 6-12%
   $La_2O_3$ 30-34%
   $Nb_2O_5$ 4-8%
   $Ta_2O_5$ 0-1%
   $Y_2O_3$ 0-1%
   ZnO 4-9%
   $TiO_2$ 4-8%
   $ZrO_2$ 4-6%
   $SnO_2$ 0-1%
   wherein the glass with high refractive index has a refractive index of 1.80-1.82, a coefficient of mean linear thermal expansion of $(68\pm5) \times 10^{-7}/°$ C. in the range of 30-300° C., a strain point temperature of more than 600° C., and a devitrification temperature of more than 820° C.

2. The composition according to claim 1, comprising the following components in percentage by weight:
   $SiO_2$ 9%
   $Al_2O_3$ 1%
   $B_2O_3$ 23%
   BaO 12%
   $La_2O_3$ 34%
   $Nb_2O_5$ 4%
   $Ta_2O_5$ 0.5%
   ZnO 4%
   $TiO_2$ 8%
   $ZrO_2$ 4%
   $SnO_2$ 0.5%.

3. A fabrication method for the glass with high refractive index for fiber optic imaging elements with medium-expansion with the composition according to claim 1, comprising the following steps:
   (1) putting quartz sand, aluminum hydroxide, boric acid or boric anhydride, calcium carbonate, barium carbonate or barium nitrate, lanthanum oxide, niobium oxide, tantalum oxide, yttrium oxide, zinc oxide, titanium dioxide, zirconium oxide and stannic oxide into a platinum crucible according to the requirement of dosing;
   (2) melting at a first preset temperature, stirring in the melting process, then cooling to a second preset temperature and fining to obtain a fining glass melt;
   (3) allowing the fining glass melt to flow down through a leaking port, and casting the fining glass melt in a mold to form a glass rod;
   (4) annealing the molded glass rod in an annealing furnace, and then cooling to room temperature along with the furnace.

4. The method according to claim 3, wherein the first preset temperature is 1350-1450° C.; the time of melting is 4-8 hours; the stirring in the melting process is 1-2 times; the second preset temperature is 1300-1340° C.; the time of fining is 1-2 hours.

5. The method according to claim 3, wherein the annealing process is preserving heat for 1 hour at 600-650° C., and cooling to 60° C. from 600-650° C. for 12 hours.

6. A glass with high refractive index for fiber optic imaging elements with medium-expansion, wherein the glass with high refractive index is fabricated by using the fabrication method according to claim 3.

7. The glass with a high refractive index for fiber optic imaging elements with medium-expansion according to claim 6, wherein the glass with high refractive index is fabricated into an optical glass having a viscosity curve with strong liquid fragility in the viscosity range of $10^2$-$10^{13}$ dPas.

8. A fiber optic imaging element, comprising a fiber optical faceplate, a fiber optical image inverter, a fiber optical taper and a fiber optical bundle for image transmission, wherein the fiber optic imaging element is fabricated by a drawing process of combing a core glass rod and a cladding glass tube, and the core glass rod is fabricating by using the glass with a high refractive index according to claim 6.

* * * * *